No. 612,346. Patented Oct. 11, 1898.
C. W. KING.
LASTING MACHINE.
(Application filed Oct. 3, 1896.)
(No Model.) 6 Sheets—Sheet 1.

Fig-1-

WITNESSES

INVENTOR
Charles W. King,
Per Edwin W. Brown,
Attorney.

No. 612,346. Patented Oct. 11, 1898.
C. W. KING.
LASTING MACHINE.
(Application filed Oct. 3, 1896.)

(No Model.) 6 Sheets—Sheet 2.

WITNESSES

INVENTOR
Charles W. King,
Per Edwin W. Brown,
Attorney.

No. 612,346. Patented Oct. 11, 1898.
C. W. KING.
LASTING MACHINE.
(Application filed Oct. 3, 1896.)
(No Model.) 6 Sheets—Sheet 3.
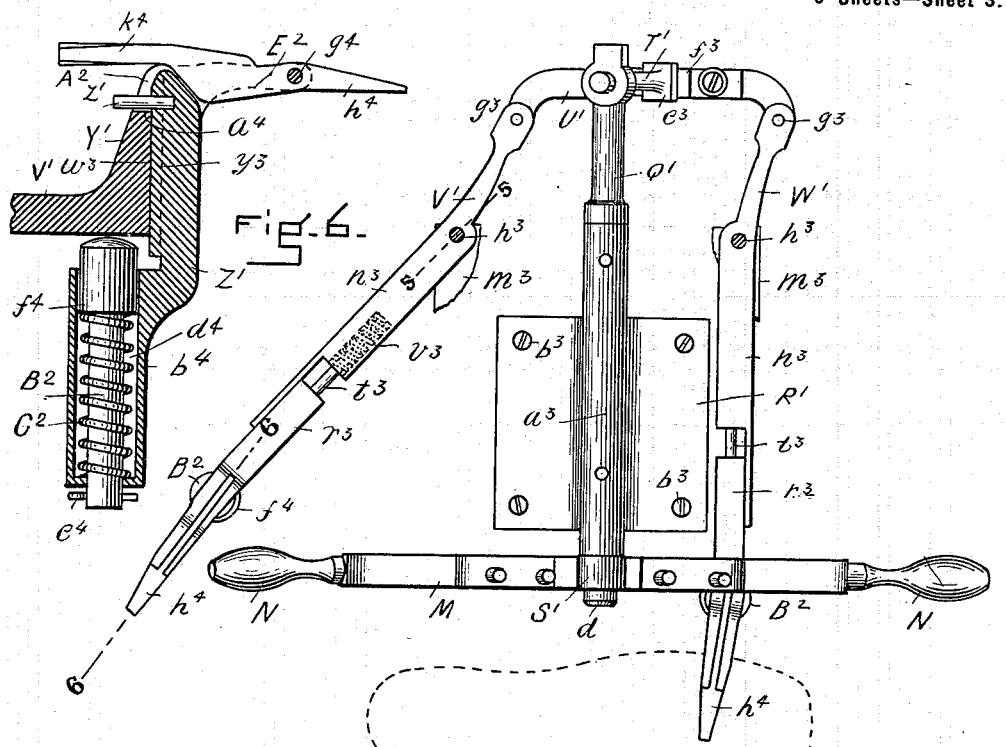
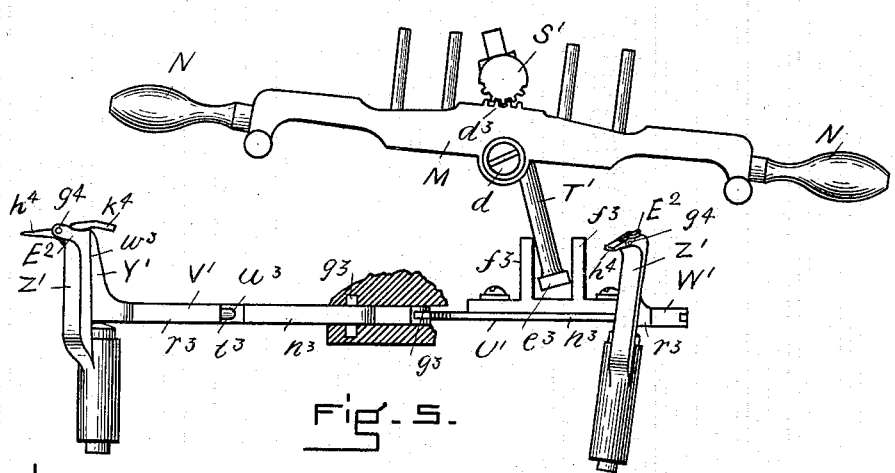
WITNESSES
INVENTOR
Charles W. King,
Per Edwin W. Brown,
Attorney.

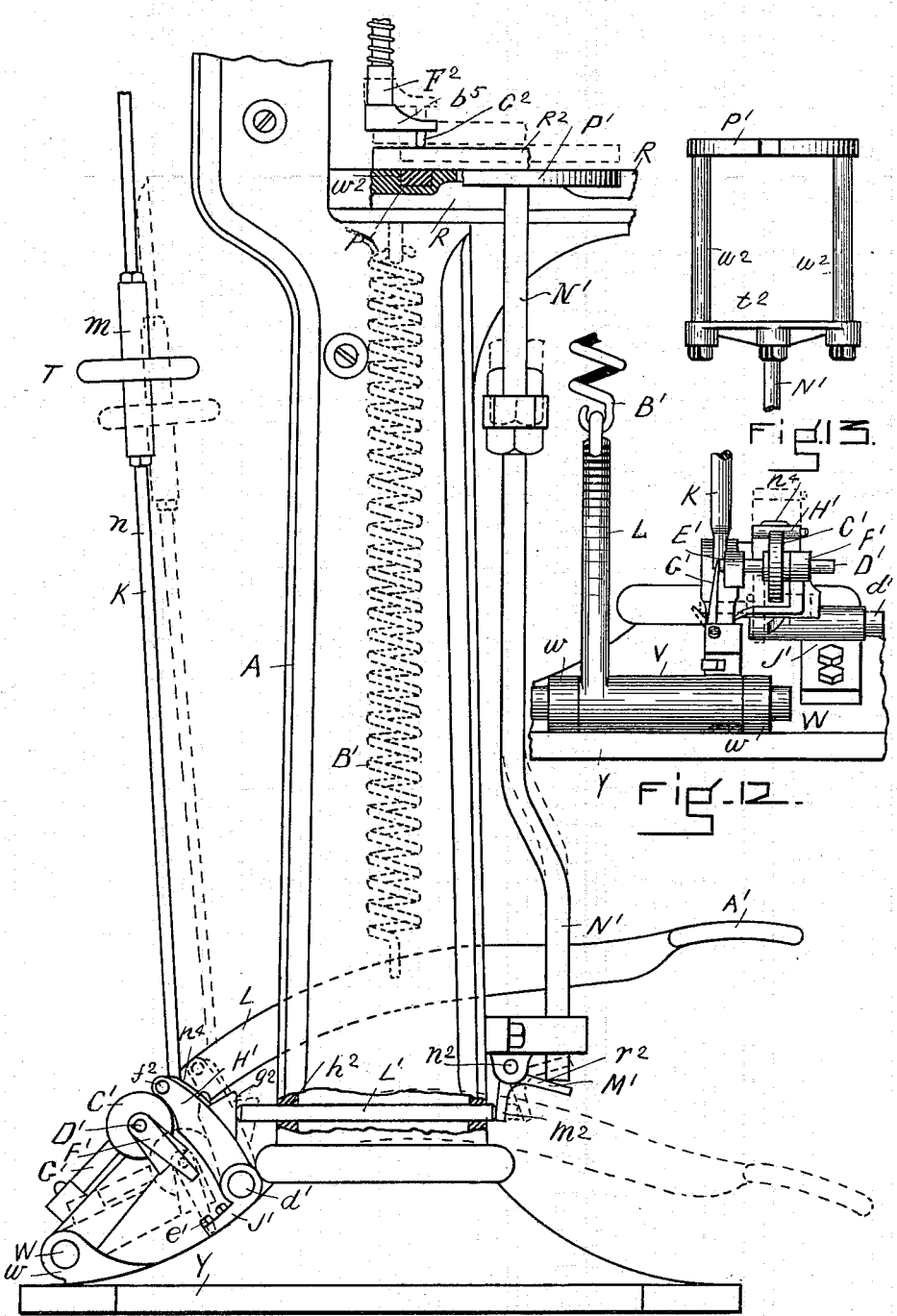

No. 612,346. Patented Oct. 11, 1898.
C. W. KING.
LASTING MACHINE.
(Application filed Oct. 3, 1896.)
(No Model.) 6 Sheets—Sheet 5.
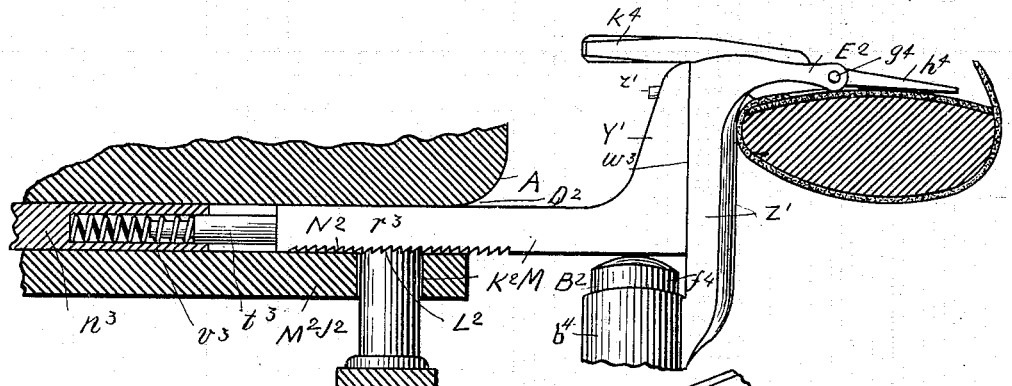
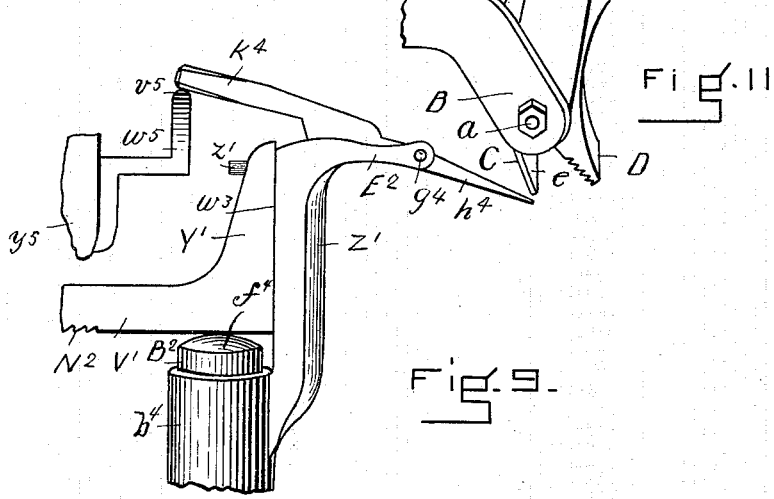
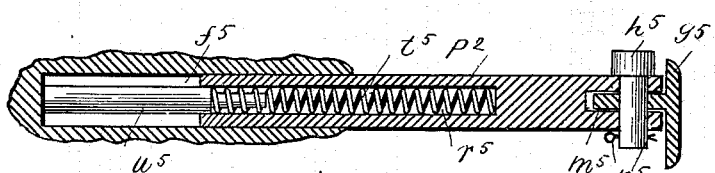
WITNESSES
INVENTOR
Charles W. King,
Per Edwin W. Brown,
Attorney.
THE NORRIS PETERS CO., PHOTO-LITHO., WASHINGTON, D. C.

No. 612,346. Patented Oct. 11, 1898.
C. W. KING.
LASTING MACHINE.
(Application filed Oct. 3, 1896.)
(No Model.) 6 Sheets—Sheet 6.
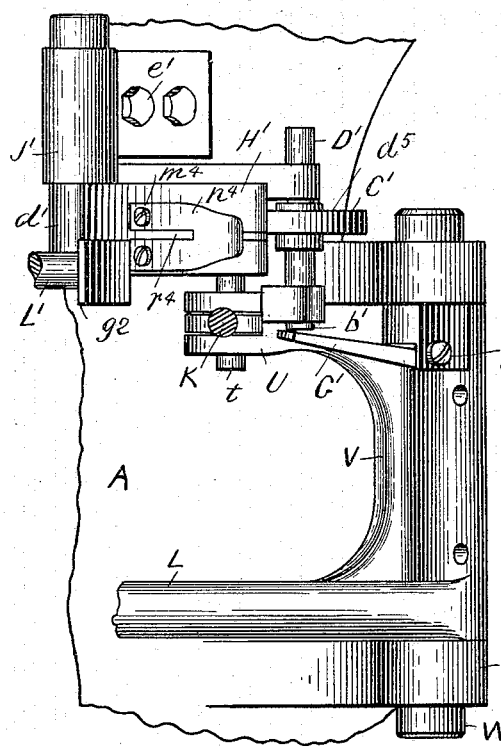
Fig. 14.
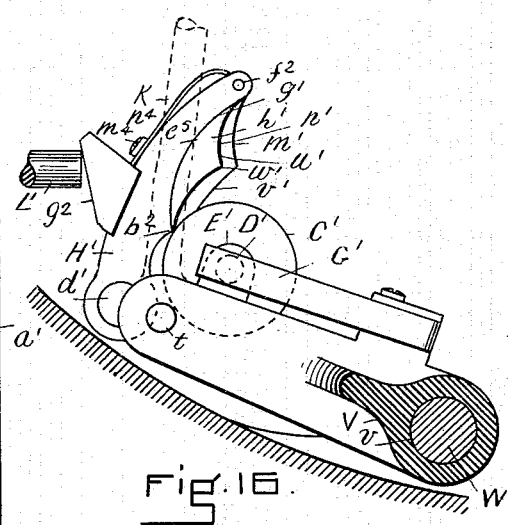
Fig. 16.
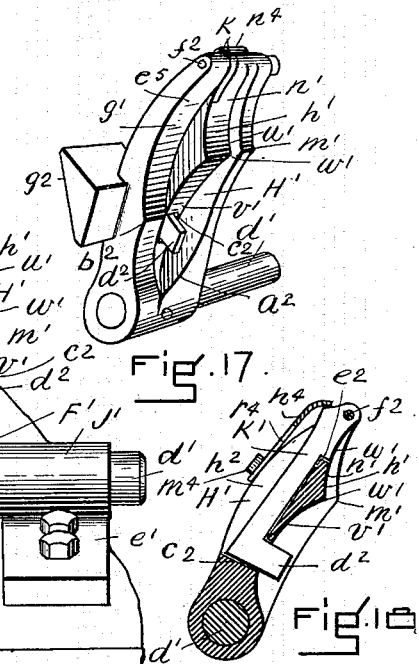
Fig. 17.
Fig. 18.
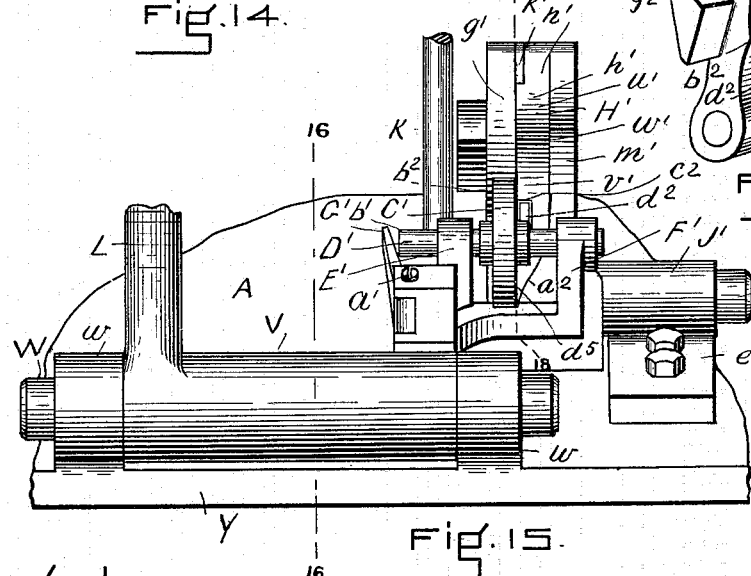
Fig. 15.
WITNESSES
INVENTOR
Charles W. King
Per Edwin W. Brown
Attorney.
THE NORRIS PETERS CO., PHOTO-LITHO., WASHINGTON, D. C.

UNITED STATES PATENT OFFICE.

CHARLES W. KING, OF NEWTON, MASSACHUSETTS; EMMA H. KING AND JOSEPH H. CALDWELL, EXECUTORS OF SAID CHARLES W. KING, DECEASED, ASSIGNORS TO THE PURITAN LASTING MACHINE COMPANY, OF PORTLAND, MAINE.

LASTING-MACHINE.

SPECIFICATION forming part of Letters Patent No. 612,346, dated October 11, 1898.

Application filed October 3, 1896. Serial No. 607,781. (No model.)

*To all whom it may concern:*

Be it known that I, CHARLES W. KING, of Newton, in the county of Norfolk and State of Massachusetts, have invented certain new and useful Improvements in Lasting-Machines, of which the following is a full, clear, and exact description.

This invention relates to improvements in lasting-machines, and more particularly to the lasting-machine described and shown in Letters Patent of the United States, dated July 25, 1893, No. 502,236; and the object of the present invention is to provide means when the first side of the upper is being lasted in the above lasting-machine to hold the other side of the upper to prevent the upper at such latter side being pulled or drawn out of or from its proper position, also to hold the inner sole down close upon the last when lasting the upper, and also to provide means for presenting the upper on the last in proper position for the operation of the lasting-machine upon it; and the invention consists in the novel construction and combination of parts hereinafter described, and set forth in the claims, reference being had to the accompanying sheets of drawings, in which is illustrated the present invention in connection with a lasting-machine constructed as described and shown in said patent.

Figure 1:
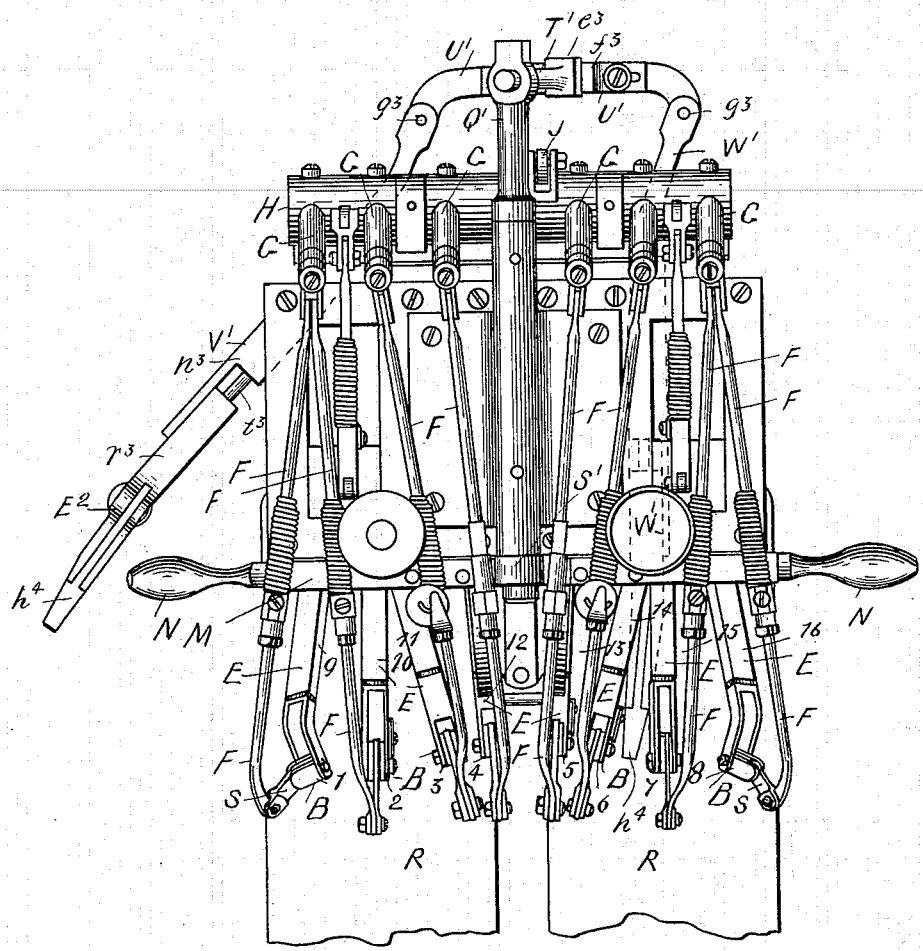
Figure 2:
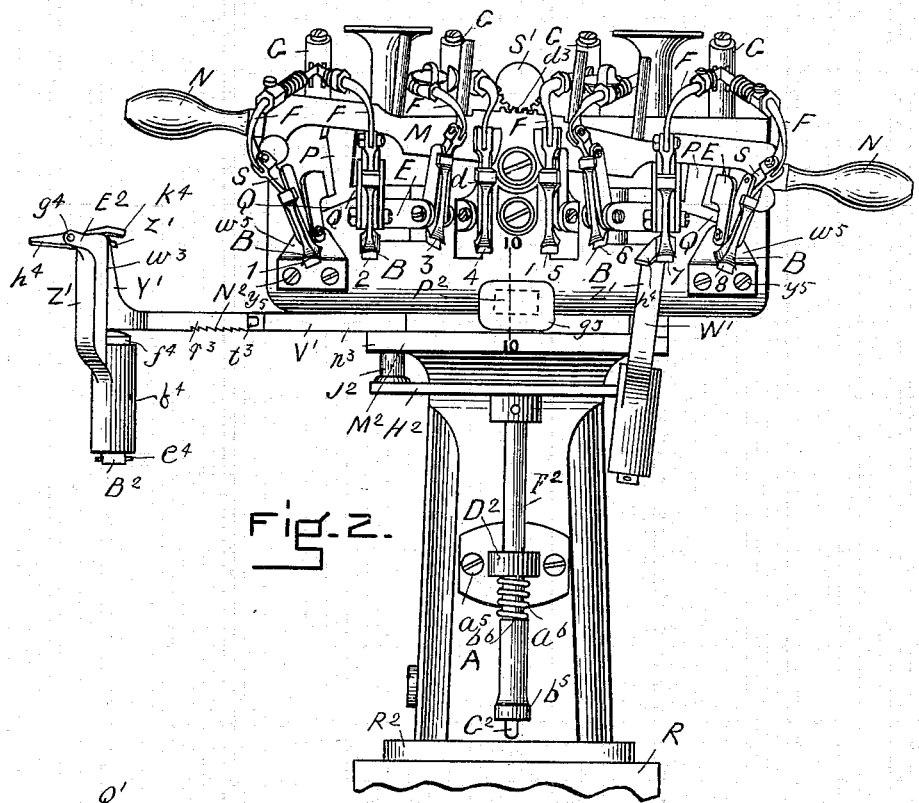
Figure 3:
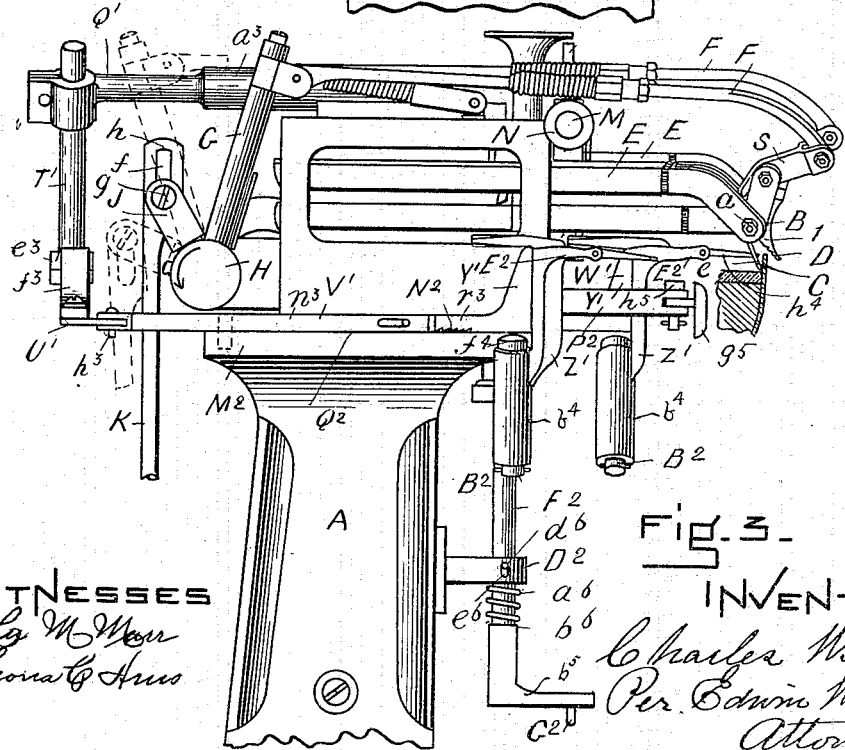

Figure 1 is a plan view of the lasting-machine. Fig. 2 is a front view of Fig. 1. Fig. 3 is a side view of Fig. 1. Fig. 4 is a detail view of some of the operating parts. Fig. 5 is a front view of Fig. 4, with parts in detail section on line 5 5 in same figure. Fig. 6 is a detail vertical section on line 6 6, Fig. 5, and a side elevation enlarged. Fig. 7 is a side elevation of the standard and parts connected therewith below the parts shown in Fig. 3. Fig. 8 is a detail side view and partial section of the parts shown in Fig. 6. Fig. 9 is a detail side view of the parts in Fig. 8 with an additional element. Fig. 10 is a detail vertical section on line 10 10, Fig. 2. Fig. 11 is a detail view of one of the jaws for grasping the upper. Fig. 12 is a detail view of the lower part of Fig. 7. Fig. 13 is a detail front elevation, to be hereinafter referred to. Fig. 14 is a plan view of Fig. 15 turned around. Fig. 15 is a view like Fig. 12, the parts being enlarged. Fig. 16 is a detail section on line 16 16, Fig. 15. Fig. 17 is a perspective view of one of the parts in Figs. 15 and 16. Fig. 18 is a detail section on line 18 18, Fig. 15.

In the drawings, A represents a frame or standard which supports and carries the various parts of this machine.

B B are pairs of jaws, in the present instance there being eight pairs of jaws, each consisting of two jaws C D, pivoted together at $a$, and all arranged substantially in a horizontal plane, or a plane substantially parallel to the longitudinal contour or outline of the bottom of the last of the boot or shoe to be lasted. These jaws project forward of the frame, as shown more clearly in Fig. 3, and each pair of jaws is connected to the front of a horizontal bar E, extending backward and adapted to slide backward and forward in suitable guideways in the frame and in lateral diverging lines, as shown more particularly in Fig. 1. Each pair of jaws is pivotally connected to a rod F, which extends back over the top of the machine, and each rod is pivotally connected to a vertical arm G of a horizontal cross rock-shaft H, adapted to partially rotate in bearings in the back part of the frame. Connected to the rock-shaft H is an arm J, which is connected by a rod K to a treadle L for operation of the same.

M is a cross horizontal bar pivoted at $d$ to the front of the frame, and it has a handle N at each end for operation of same to rock or swing it up and down on its pivot $d$, within certain limits, controlled by stops on the frame. (Not shown.) Projecting downward from this swinging bar M are arms P, one at each end, which pass freely between the outer two of the movable jaw-holding bars E, respectively, on each side, these arms P having oppositely side projecting portions Q extending under the two jaw-holding bars next thereto. (Shown somewhat in Fig. 2.) The object of this swinging bar as it is swung up and down on its pivots is to raise and lower alternately the two outer jaw-holding bars E at their front ends, and consequently the pairs of jaws B, connected thereto.

The operation of the machine thus far described is substantially as follows: With the machine in the positions shown in the principal figures in the drawings, the last, having the inner sole and upper placed upon it, is placed upon a suitable jack, with the toe at the right, the jack resting upon the bed R of the standard and moved back thereon until the side of the boot-upper farthest from the machine, at or about the edge, is between the operating faces $e$ of the several lower jaws C to guide-bars 3, 4, 5, 6, 7, and 8, as shown in detail section as to one pair of jaws in Fig. 3. The jack being held firmly in position, press down the treadle, which will turn the rock-shaft H in the direction of the arrow in the figure, by which the arms G, through their respective connecting-rods F to the arms or levers S of the several pairs of jaws, will cause the upper jaws D, by their connection therewith, assisted by gravity, to swing on their pivots or fall down to and close upon the lower jaws C, grasping and holding between the two jaws of each pair of jaws the edge of the upper between them. When so closed, the continued movement of the shaft H pulls back the guide-bars E, and by the hold of their jaws upon the upper it is stretched firmly over the edge of the inner sole and held down upon the outer surface thereof, according to the stretch and tightness required, when the upper is secured to the inner sole in any suitable manner.

Eight pairs of jaws are shown, (numbered 1 to 8, respectively,) and their respective guide-bars are numbered 9 to 16, respectively, but only six of the jaws are used at a time. For instance, the four middle jaws 3, 4, 5, and 6 are used at all times; but when the boot is lasted with the toe at the right, the two jaws 7 and 8 are used with the central jaws, but the two, 1 and 2, at the left are not used, and when the boot is turned around to last the other side, with the toe at the left, the two jaws 1 and 2 at the left are used with the central jaws, but the two jaws 7 and 8 at the right are not, and the object of the lever M is to raise and lower alternately these two outer pairs of jaws, respectively, as they are desired for use or not.

As shown in the drawings, the lever M is swung on its pivot $d$ for its left-hand end to be higher, raising the two outer pairs of the jaws at the left out of the way or position to operate and for the two pairs of jaws at the right to operate in lasting the upper. Having lasted one side of the upper, the other side is lasted by moving the jack back from the machine and turning it half around and then moving it back in place for the other side of the boot-upper to be in position for the jaws to operate thereon as before for the first side of the upper, except in this position the other two pairs of jaws 1 and 2 at the left are allowed to fall into position for operation on the upper, while the two pairs of jaws 7 and 8 at the right are raised out of position, so they cannot operate on the upper.

The above is a brief description of the construction and operation of parts of the lasting-machine described and shown in said patent and sufficient it is thought to understand the present improvements in connection therewith, reference being had, however, to said patent for a more complete description of the construction and operation of the machine in detail.

With the machine constructed and arranged for operation on the first side of the upper, as described and shown in the patent, there is nothing to firmly hold the upper at the other or free side at or near the toe to prevent its being pulled somewhat out of place in pulling over the first side of the upper, and also there is nothing to hold the inner sole at the ball close down upon the last for the better and more even lasting of the upper, and the present invention is for the purpose of overcoming these deficiencies as well as to present the side of the upper being lasted to the pulling-jaws in an easy and convenient manner and to a certain extent automatically, and these are accomplished in connection with the operation of the treadle which operates to pull the jaws when lasting the upper, all of which will be now fully described.

The pitman-rod K is connected to the arm J of the rock-shaft H by a longitudinal slot $f$ in the rod, disposed over a pin $g$ of the arm J, and in its normal position, which is shown in Fig. 3, the rod is up for the upper part of the slot $f$ to be above the pin $g$, so that as the rod is pulled down it will have no effect upon the rock-shaft for the first part of its downward movement until the upper end $h$ of the slot bears upon the arm-pin $g$, when in its continued downward movement it pulls upon the arm J and swings the shaft for operation of the jaws, as above described.

The pitman-rod K is made in two parts $m$ and $n$, each adjacent end having a screw-thread, one a right and the other a left thread, and connected by a screw-nut T, having a right and left screw-thread, which screws onto the adjacent ends of the two parts of the rod, by which the rod can be adjusted as to its length as desired. The lower end of the rod is flattened and has an opening which fits over a pin $t$, adapted to turn in bearings in an arm U of a block or plate V, having an opening $v$, which fits over a pin or bolt W, secured in bracket-arms $w$ of the base Y, on which bolt or pin the plate V rocks or swings up and down. To the opposite end of the plate V is secured the treadle L, which extends forward in front of the standard, (shown in Fig. 7 more particularly,) having a foot-piece A'. Connected to the middle portion of the treadle is a spiral spring B' on the side of the standard, its other end secured to a hook on the under side of the platen or bed R, which acts to hold the treadle up and the various parts of the machine controlled by it in their normal position, as shown in Fig. 7 more particularly.

C' is a friction wheel or roll secured to its journal-pin D', adapted to turn in bearings in an arm E' and a right-angular arm F' of the plate V and adapted to be moved back and forth sidewise by its journal-pin D' being free to slide longitudinally in its bearings.

G' is a spring secured by a screw $a'$ to the block V and bearing by its end against the projecting end $b'$ of the wheel-journal D' to hold it in and return to its normal position, or to the right from the front of the machine, as shown in Figs. 12 and 14 more particularly.

H' is an arm secured to one end of a journal-pin $d'$, adapted to turn in a bearing in a lug J', secured to the base-plate by a screw $e'$, the journal-pin $d'$ being held in place by a washer and set-screw. This arm is slightly curved backward, and its rear edge or side is divided longitudinally into three vertical portions $g'$, $h'$, and $m'$, side by side, the central one, $h'$, of which when the arm is in its normal position bears at $n'$ upon the wheel or roll C', its surface extending backward in two curved portions $u'$ $v'$, with a backward projection $w'$ at their junction, the outer portion $m'$ extending backward beyond the surface of the middle portion, forming a shoulder, and which has at its lower part a side beveled portion $a^2$, which extends laterally over the lower portion of the central portion $h'$, as shown in Figs. 15 and 17 more particularly. The other portion $g'$ is curved in its upper and lower parts, as shown in Fig. 17, having a raised portion at the junction of the two, as at $b^2$.

Projecting backward through a slot $c^2$ in the middle portion $h'$, near its lower end portion, is a flat tongue $d^2$, set up edgewise, of an arm K', freely disposed in an opening $e^2$ and pivoted at $f^2$ to the end of the arm H'. (See Fig. 18.)

Secured at $m^4$ to the front of the arm H' is a flat spring $n^4$, its free end bearing against the arm K' to cause its tongue-piece $d^2$ to press backward through the opening $c^2$ when the arm is free to move, and the spring has a longitudinal slot $r^4$ through its end for the arm K' to freely pass into when moved forward. As the treadle is pressed down the arm E', carrying the roll C', is swung down and the roll pressing against the arm H' moves or swings it forward as it travels or rolls down the central portion $h'$ of the arm. As the roll moves down such portion it runs over the central projecting piece $d^2$, moving it back against its spring, and then bearing against the bevel side $a^2$ of the rib $m$ it is caused to move sidewise toward the treadle until it has passed from over the central portion $h'$ to and over and onto the curved portion $g'$ at the right, and as it so moves it passes from over the projecting piece $d^2$, which is then free to be moved forward by its spring $n^4$, and is then at the side $d^5$ of the roll, preventing its movement backward. As the treadle is allowed to rise the roll runs along the curved portion $g'$ and moving upward thereon, as its arm is swung upward on its pivot, it reaches the upper portion $e^5$ of this curved portion $g'$ and will have passed by the piece $d^2$, and as this portion $e^5$ is flush or substantially flush with the central portion at its upper part $n'$ the roll is free to be moved back on its journal D' by the action of its spring G' into its normal position on the portion $n'$, ready for action, as before.

The front of the arm H' has a bearing place or shoulder $g^2$, against which rests and bears one end of a horizontal pin L', adapted to slide back and forth in a socket $h^2$ in the standard, its other end projecting in front of the standard and bearing against one arm $m^2$ of an angular lever M', pivoted at $n^2$ to the standard, on the other arm $r^2$ of which rests a vertical rod N', connected to the under side of the middle of a bar $t^2$, having upright arms $u^2$, one at each end, which are arranged to slide up and down through openings in the bed or rest R, and having secured to their upper ends a horizontal ring P', which is freely disposed in its normal position in a circular groove $w^2$ in the upper surface of the bed R, its upper surface being flush with the upper surface of the bed.

Q' is a rod adapted to turn in a bearing $a^3$ in a plate R', secured by screws $b^3$ to the frame, prevented from longitudinal movement therein, and having on its end a segment of a gear S', which is arranged to engage with teeth $d^3$ on the upper edge of the lever M, vertically over its center pin or pivot $d$, as shown in Fig. 5.

On the rear end of the rod Q' is secured an arm T', which projects downward therefrom, its lower end having a square plate or block $e^3$ on it, which is disposed freely in and between two upright arms $f^3$ of a curved horizontal bar U', which at each of its ends is pivoted, respectively, at $g^3$ to two arms V' W', arranged to project forward and pivoted, respectively, at $h^3$ to supports $m^3$ on the frame, as shown more particularly in Fig. 4. Each arm V' W' is in two parts $n^3$ $r^3$, and they are connected together by a longitudinal projecting pin $t^3$ in the one part $r^3$, which projects into a central longitudinal socket $u^3$ in the other part $n^3$, by which the part $r^3$ can have a longitudinal movement forward and backward within certain limits, and in the socket $u^3$ is a spiral spring $v^3$ over the pin $t^3$, which acts to hold forward the part $r^3$ and to return it to its forward position when moved back against its spring. The forward end of the bar W' extends upward, as at Y', having its face $w^3$ substantially at right angles to the bar, on which face is a vertical arm Z', connected thereto by a dovetail joint $y^3$, so that the bar can move up and down within certain limits. A horizontal pin $z'$, secured to the upper end of the arm Z', projects through a central vertical slot A² in the angular portion Y' of the bar V', also bar W', and rests upon the bottom $a^4$ of the slot A² to hold the bar in its lowermost position, as shown in Fig. 6. In an under part $b^4$ of each arm Z' is a vertical socket $d^4$, in which is a pin B², adapted to slide up and down therein, its upper end bearing against the under side of the bar V' or W' near its front end, its lower end projecting through the bottom of the part $b^4$ and having a cross-pin $e^4$ secured therein to prevent any farther upward movement of the pin B² than is required to hold it in its socket. Within the socket $d^4$ is a spring C², encircling the lower portion of the pin B², such portion being reduced in diameter, the spring bearing against the lower end of the socket and by its upper end against the head $f^4$ of the pin, which spring serves to hold the pin up by its tension. The arm $y'$ has a horizontal forwardly-extending piece E², between the forward forked front ends of which is pivoted at $g^4$ a finger $h^4$, projecting still farther forward and having an arm $k^4$ extending back for operating it. The front edge of the arm Z' is rounded somewhat in cross-section.

As the lever M is swung on its pivot $d$ through its gear connection with the rod Q' the rod T' is swung to the right or left, and as its end is between the uprights $f^3$ of the arm U' the arm is caused to move to the left or right, carrying the back ends of the arms V' W' with it and swinging the front ends of the arms to the right or left correspondingly. As shown in Figs. 4 and 5, the lever is swung down at its right-hand end, which has correspondingly caused the arm W' to move or swing forward into substantially a line from front to the rear and the arm V' to swing or move off in an angular direction out of the way, as shown more particularly in Fig. 4.

If the lever M is swung on its pivot to have it the reverse of that shown in Figs. 4 and 5, the arm T' will be moved to the left, carrying with it the curved arm, swinging the arms V' W' on their pivots into positions the opposite of that shown in Fig. 4—that is, the arm V' will be forward in line with the machine and the arm W' off out of the way or angularly to it.

F² is a vertical arm in front of the standard adapted to slide up and down in a lug D², secured to the standard at $a^5$ and having at its lower end a forwardly-projecting foot $b^5$, which near its outer end has a pin G² projecting downward from its under side, and which pin is vertically over the rear portion of the ring P' in the bed-plate or rest R. Secured on the upper part of this vertical arm F² is a horizontal cross-bar H², which extends each way, and at each end it has secured to it a vertical block J², which extends up through an opening K² in the part M² of the frame, but when in its normal position its upper end is just below the upper surface of the plate M², so as to leave the surface free.

The upper end of each block J² has ratchet-teeth L² across it, which are parallel with the front of the machine, and these blocks are so located in the plate M² that the arms V' or W' will respectively be over one or the other, as the case may be, when in its forward position for operation.

The under edge of each arm V' W' has ratchet-teeth N², which when the arm is over its respective block J² will engage therewith and prevent the backward movement of the arm or longitudinally, as shown more particularly in Fig. 8.

As the arm H' is moved forward, as described, its part $g^2$ bears upon the pin L', which in turn through the angular lever raises the rod N', and through it its ring P', which in turn forces up the bar F², raising its ratchet-toothed block J², so that according to whichever of the arms V' W' is in position thereover or forward for operation its respective block J² will engage by its ratchet-teeth with the ratchet-teeth of the arm to hold it, as described.

As the last, with the upper and inner sole thereon, is pressed backward into position to place the edge of the upper between the jaws the farther side of the upper is pressed against the arm V' or W', according as the one or the other has been moved into proper position therefor, which firmly holds the upper against the last at such place, so that as the other or front side of the upper is being lasted it will not pull upon the upper on the rear side to move it out of its proper place for it to be afterward properly lasted, while at the same time the finger-piece of the arm is pressing down firmly upon the inner sole and holding it in close position to and upon the last. These swinging arms are moved to hold the upper and inner sole at whichever side the outer jaws of the series of jaws are being used, so that as either two of the outer jaws are to be used in lasting the upper as the lever M is swung to bring the proper jaws into proper position to operate upon the upper the arm V' or W' is also brought into its proper position to act upon the upper and inner sole, as described. Therefore as the lever is moved to bring the proper outer jaws into position for operation upon the upper the right swinging arm is also correspondingly moved into position to hold the upper and inner sole at such place.

P² is an arm arranged to be moved backward and forward in a socket $f^5$ in the standard, having a head-plate $g^5$, provided with a pin $h^5$, which freely fits in a central socket $m^5$ in the outer end of the arm and secured therein by a cross-pin $n^5$, which holds the head from escapement and yet allows it to have a slight rocking movement to accommodate itself to its work. The arm P² has a central longitudinal socket $r^5$, in which is a spiral spring $t^5$, bearing by one end against the socket end and by its other end against a shoulder on a rod $u^5$, secured in the socket. In pressing the last back into position for the upper to be lasted in the machine it is pressed against this head-plate, which is forced back against its spring, the spring acting when the last is moved forward to change the side being operated upon to assist in such movement.

As the finger $h^4$ to each arm is at such a height as to strike against the outer jaws when moved forward it is arranged to be swung down out of the way, and this is done by its back arm $k^4$ being arranged to strike and ride upon an edge $v^5$ of an angular piece $w^5$, secured to the standard at $y^5$, which swings the finger down, as shown in Fig. 9, so it will freely pass under the jaws without striking them, and having passed by them its arm drops from the piece, when the finger is in proper position for operation on the inner sole.

The object of the arm or lever H' and its connections is to raise and lower the jack supporting the last and to adjust and regulate such movements in accordance with the movements of the jaws in pulling over the upper in lasting, and the operation is as follows: With the upper in place upon the last and the jack moved back on the bed R in suitable position for the jaw to operate on the upper the jack will be over the ring P' in the bed R, and when in such position the treadle is pushed down, which immediately raises, through the movement of the arm H' by the pressure of the arm-roll C' thereon, the ring, and consequently the jack, to its highest position, bringing the edge of the upper at its front side into position between the jaws. This raising of the jack is accomplished before the jaws are acted upon by the movement of the treadle, the slot $f$ in the pitman-rod K allowing it sufficient downward movement for such purpose before acting upon the shaft-arm J. In the continued downward movement of the treadle the jaws are operated to last the upper, as has been described, and after it has been secured the treadle is allowed to rise, and as soon as it is raised high enough to let the jaws move back and to open sufficiently to release their hold upon the upper the arm H' will have moved back sufficiently for it to allow the ring P' to fall, which lets the jack down for the upper to be then free of the jaws, so that the jack can be moved forward on its rest to turn it to last the other side of the upper of the boot or to remove the upper from the last, as desired. The cam-surfaces of the arm H' are arranged and shaped as described and shown for the proper bearing of the arm-roll thereon to accomplish the results described.

Any suitable form of the movable support for the jack can be used other than the form of the ring; but the movable portion is separate from the main bed and the ring form is preferable, as it gives a broad base for the jack to rest upon when moving it and holding it up to the lasting operation. It is light and does not require as much force to move it as would be the case if the whole bed were movable.

When either of the arms V' W' is swung forward into position for it to bear against the last, it passes into a horizontal space or opening $Q^2$ in the standard, as shown in detail in Fig. 8, and closely fitting therein it is prevented from moving up or down and is there held firmly in place when the upper on the last is pressed against it in being lasted, and when the arm is so placed it is over the opening $K^2$ in the part $M^2$ of the standard, in which opening is the ratchet-toothed block $J^2$, so that at such time as the block is raised by the upward movement of the rod $F^2$ by the base-plate of the jack being pressed upward by the movement of the ring, as described, its ratchet-teeth engage with the ratchet-teeth of the arm, which holds it firmly against backward movement as the last and upper are pressed against it by the operator in the lasting operation. As the jack is lowered the rod falls and the toothed block also falls, leaving the arm free to be swung back, as desired.

In Fig. 7 is shown in detail, in side view and partial section, the ring P', which is operated to raise the jack, in its normal position, and in dotted lines in its raised position, with the rod, and in such view is shown in detail, in edge view, the base-plate of the jack in position on the bed-plate $R^2$, with the rod $F^2$, by its pin $G^2$, just resting on it, this rod being just high enough, in its normal position, for the base-plate of the jack to freely slide under the pin when the jack is pushed back on the bed.

Obviously the rod can be operated directly from the ring in lieu of the intermediate base-plate of the jack.

This invention is not to be limited to the special lasting-machine referred to, but is applicable to other forms of lasting-machines.

The arm $F^2$ has a spring $a^6$ bearing against a shoulder $b^6$ on the arm and the lug $D^2$ to press the arm down, its movement being limited by a cross-pin $d^6$ in a socket or slot $e^6$ in the lug.

Having thus described my invention, what I claim is—

1. In a lasting-machine, in combination, mechanism for lasting the upper, an arm pivoted at the rear of the machine and adapted to swing forward into position to press against the upper being operated upon on the last.

2. In a lasting-machine, in combination, mechanism for lasting the upper, an arm pivoted at the rear of the machine and adapted to swing forward into position to press against the upper being operated upon on the last and means for moving said arm.

3. In a lasting-machine, in combination, mechanism for lasting the upper, an arm pivoted at the rear of the machine and adapted to swing forward into position to press against the upper being operated upon on the last and a pivoted lever connected to the arm to swing it into position for operation.

4. In a lasting-machine, in combination, mechanism for lasting the upper, an arm pivoted to a support, the arm made in two parts and connected together for longitudinal movement, one upon the other, a pivoted lever for operation thereof, the arm being arranged to move into position to press upon the upper being operated upon on a last.

5. In a lasting-machine, in combination, mechanism for lasting the upper, two arms pivoted to a support and adapted to be moved into position to press against the upper being operated upon, on the last, an arm pivotally connected to said arms, a pivoted lever, gear-teeth on the lever, a segment of a gear arranged to engage with the gear-teeth on the lever, a journal or pin adapted to rotate in a suitable support to which the gear is secured, an arm secured to the journal arranged to engage with the swinging arm for operation thereof.

6. In a lasting-machine, in combination, mechanism for lasting the upper, two arms pivoted to a support and adapted to be moved into position to press against the upper being operated upon, on the last, an arm pivotally connected to said arms, a pivoted lever, gear-teeth on the lever, a journal or pin adapted to rotate in a suitable support to which the gear is secured, an arm secured to said journal, two shoulders on the upper side of the arm connecting the two swinging arms, against which the lower end of the arm of the journal bears for operation thereof.

7. In a lasting-machine, in combination, mechanism for lasting the upper, an arm pivoted to a support, means for operating the arm, another arm secured to the first arm adapted to be moved up and down thereon, a spring on the second arm arranged to bear against the under side of the first arm, and a finger or arm pivoted to the second arm, the second arm being adapted when its supporting-arm is moved into proper position to press upon the upper being operated upon on the last.

8. In a lasting-machine, in combination, mechanism for lasting the upper, an arm pivoted to a support, the pivoted arm being adapted to be moved into position to press against the upper being operated upon on the last, a lever pivoted to a support and connected to the pivoted arm for operation thereof, the pivoted arm made in two parts and connected together by a pin-and-socket joint and a spring.

9. In a lasting-machine, in combination, mechanism for lasting the upper, an arm pivoted to a support made in two parts and connected together longitudinally by a pin-and-socket joint and a spring, and means for operating the pivoted arm, the pivoted arm being adapted to be moved into position to press against the upper being operated upon on the last.

10. In a lasting-machine, in combination, mechanism for lasting the upper, a jack or support for the last for the upper, a stationary bed or rest for the jack, a support for the jack independent of said bed-plate, and means connected to the independent support to raise and lower it whereby the jack is raised from its stationary bed and lowered onto the same.

11. In a lasting-machine, in combination, mechanism for lasting the upper, a bed-plate or rest for the jack, a ring-plate freely disposed in a corresponding groove in the bed-plate and means connected to the ring for operation thereof.

12. In a lasting-machine, in combination, mechanism for lasting the upper, a bed-plate or rest for the jack, a ring-plate disposed in a corresponding groove in the bed-plate or rest, a rod connected thereto, an angular lever on which the rod rests or bears, a pivoted arm to operate the lever and means for operating the arm, to raise and lower the ring-plate.

13. In a lasting-machine, in combination, mechanism for lasting the upper, a bed-plate or rest for the jack, a ring-plate disposed in a corresponding groove in the bed-plate or rest, a rod connected thereto, a pivoted angular lever on which the rod bears, a pivoted arm having two cam working surfaces and a rib or shoulder at one side, a rod or pin between the angular lever and pivoted arm, an arm arranged to bear and work on said cam-surfaces and means for operating the latter arm for purpose specified.

14. In a lasting-machine, in combination mechanism for lasting the upper, a bed-plate or rest for the jack, a movable support in said bed-plate, resting on a pivoted angular lever, a pivoted arm having two cam working surfaces and a rib or shoulder at one side, an arm arranged to bear and work on said cam-surfaces, means for operating the latter arm, and the pivoted arm being arranged to operate the angular lever.

15. In a lasting-machine, in combination, mechanism for lasting the upper, a bed-plate or rest for the jack, a ring-plate disposed in a corresponding groove in the bed-plate or rest, a rod connected thereto, a pivoted angular lever on which the rod bears, a pivoted arm having two cam working surfaces and a rib or shoulder at one side, a rod or pin between the angular lever and pivoted arm, an arm arranged to bear and work on said cam-surfaces, means for operating the latter arm and a spring-arm arranged to extend through the cam-arm.

16. In a lasting-machine, in combination, mechanism for lasting the upper, a bed-plate or rest for the jack, a ring-plate disposed in a corresponding groove in the plate or rest, a rod connected thereto, a pivoted lever on which the rod bears, a pivoted arm having two cam working surfaces, a rod or pin between the lever and pivoted arm, a rib or shoulder at one side having an inclined cam edge, an arm provided with a roll journaled therein and arranged to bear upon said cam-surfaces and means for operating the arm.

17. In a lasting-machine, in combination, mechanism for lasting the upper, a bed-plate or rest for the jack, a movable support in said bed-plate, a rod to said support resting on a pivoted angular lever, a rod or pin disposed in a socket in the support for the machine, an arm or lever having two cam working surfaces and a rib or shoulder at one side having an inclined cam edge at its lower part, the pin being between the cam-arm and the angular lever, and an arm pivoted to the support arranged to bear upon the cam-arm and means for operating the arm.

18. In a lasting-machine, in combination, mechanism for lasting the upper, a bed-plate or rest for the jack, a movable support in said bed-plate, a rod to the support resting on a pivoted angular lever, a rod or pin disposed in a socket in the support for the machine, an arm or lever having the two cam working surfaces and a rib or shoulder at one side having an inclined cam edge at its lower part, the pin being between the cam-arm and the angular lever, a pivoted arm, a roll or wheel journaled in said latter arm to bear upon the cam-arm and arranged to move back and forth sidewise, a spring to bear upon the roll-journal and means for operating the pivoted arm.

19. In a lasting-machine, in combination, mechanism for lasting the upper, an arm having ratchet-teeth on its edge pivoted to a suitable support adapted to be swung to the front of the machine to press against the upper being operated upon on the last, a groove or space in the side of the support into which the arm swings, a socket in the under part, a plug or block adapted to be moved up and down in the socket, having teeth in its upper end to engage with the ratchet-teeth of the arm and means for operating the ratchet-toothed block.

20. In a lasting-machine, in combination, mechanism for lasting the upper, an arm pivoted to a suitable support adapted to be swung to the front of the machine, to press against the upper being operated upon on the last, a groove or space in the side of the support into which the arm swings, a socket in the under part, a plug or block adapted to be moved up and down in the socket and arranged to engage with the swinging arm, and means for operating the ratchet-toothed block.

21. In a lasting-machine, in combination, mechanism for lasting the upper, an arm pivoted to a support, adapted to be moved into position to press against the upper operated upon on the last, another arm engaging with the end of the pivoted arm by an upright dovetail joint, a socket in its lower part, a plug or pin in said socket arranged to bear against the under side of the pivoted arm and a spring for operating said pin.

22. In a lasting-machine, in combination, mechanism for lasting the upper, an arm pivoted to a support and arranged to be swung to the front of the machine to press against the upper being operated upon on the last, a finger or arm pivoted to the outer end of said arm, having a backward extension, and an arm or projection on the support against which the back extension of said finger strikes and rides over when the pivoted arm is swung forward.

In testimony whereof I have hereunto set my hand in the presence of two subscribing witnesses.

CHARLES W. KING.

Witnesses:
EDWIN W. BROWN,
EMMA H. KING.